United States Patent [19]
Kullmann et al.

[11] 3,984,715
[45] Oct. 5, 1976

[54] FLUID CONTACT FOR A DC MACHINE

[75] Inventors: Dieter Kullmann, Langenzenn; Peter Henninger, Erlangen, both of Germany

[73] Assignee: Siemens Aktiengesellschaft, Munich, Germany

[22] Filed: Aug. 1, 1974

[21] Appl. No.: 493,900

[30] Foreign Application Priority Data

Aug. 16, 1973   Germany............................ 2341500

[52] U.S. Cl................................... 310/219; 310/178
[51] Int. Cl.²......................................... H02K 13/00
[58] Field of Search............... 310/219, 178, 92–105, 310/11

[56] References Cited
UNITED STATES PATENTS

| | | | |
|---|---|---|---|
| 2,615,945 | 10/1952 | Jaeschke | 310/103 |
| 2,783,643 | 3/1957 | Sihvoner | 310/93 |
| 2,990,485 | 6/1961 | Lee | 310/178 |
| 3,163,792 | 12/1964 | Sayers | 310/219 X |
| 3,168,666 | 2/1965 | Grobel | 310/219 |

OTHER PUBLICATIONS

"Magnetic Fluids and Applications Sketches," Machine Design, (Ferrofluidics Corp.), 6/14/74.

*Primary Examiner*—Donovan F. Duggan
*Attorney, Agent, or Firm*—Kenyon & Kenyon Reilly Carr & Chapin

[57] ABSTRACT

This invention concerns an improvement in a fluid contact arrangement employed in a DC machine. The invention provides a contact fluid which is interposed between the rotor and the stator of the machine. The fluid is ferromagnetic. Further, the invention provides a magnetic field which is directed perpendicular to the air gap. The effect of the magnetic field on the ferromagnetic contact fluid is such that the fluid is retained within the gap both when the rotor is at a standstill and when it operates at its normal speed.

11 Claims, 3 Drawing Figures

FLUID CONTACT FOR A DC MACHINE

BACKGROUND OF THE INVENTION

1. Field of the Invention

This invention pertains generally, to contact systems for DC machines and, particularly, to a fluid contact system.

2. Description of the Prior Art

High-power turbo generators and Dc machines require heavycurrent contacts which, oftentimes, are required to handle large currents while the rotor turns at high speed. Sliding carbon brush contacts have been used in the past but these present difficulties due to the fact that they have a relatively low current-carrying capacity — on the order of 50A/cm². For large current machines, therefore, much more space would be required for the contact brushes and their holders. Further because of the limited contact area, brush contacts result in relatively large ohmic losses, accompanied by field distortion leading, generally, to higher losses.

Uniform current distribution with its resulting lower ohmic losses it provided by known fluid contacts. Generally, these fluid contacts comprise metallic contact elements with a highly conductive contact fluid interpose therebetween. The relatively large contact surface brings about improved current conduction and low ohmic losses with corresponding low contact voltages. These fluid contacts allow for conduction of larger currents and higher rotor speeds. In a typical arrangement a fluid contact is provided between the rotor and the stator which is filled with a contact fluid under pressure. The injection pressure of the contact fluid is controlled such that it cancels whatever centrifugal forces are generated by the rotating rotor, through frictional forces acting upon the contact fluid by the rotor. However, the liquid metal portion of the contact fluid tends to flow off in an axial direction, through a ring canal, where it is collected and pumped therefrom. A gas seal is provided on each axial end of the gap between the outer perimeter of the rotor and the stator. This seal tends to reduce the loss of contact fluid. However, at higher rotational speeds, where larger centrifugal forces occur, a gas pressure face assumes a relatively high number — about 8.5 atmospheres for that situation where sodium-potassium is used as the liquid metal, where the rotor diameter is one meter, where the ring speed is 3,000 r.p.m. and where the height of the ring of contact fluid is 2 cm. Thus, with the higher rotational speeds and the tendency of fluid to flow off under increasing pressure towards the sides, the increasing counter-pressure of the lateral gas seals supplied by a relatively complex controlled system, results in a certain mixing of the gas forming the seal with the contact fluid. As a result, the conductivity of the fluid is reduced. This problem leads to a requirement for the use of separators to remove the gas contaminating the contact fluid.

It is therefore a primary object of this invention to provide a simplified fluid contact system which retains the contact fluid between the rotor and stator, even under higher rotor rotational speeds. It is another object of the invention to provide a contact fluid which is either ferromagnetic itself, or which contains ferromagnetic particles suspended in a non-magnetic metallic liquid, which fluid reacts with a magnetic field such that the fluid is restrained in the gap.

SUMMARY OF THE INVENTION

According to the invention, a contact fluid is provided which has ferromagnetic properties. The fluid is arranged in the air gap between the rotor and stator, such that it reacts with a magnetic field which permeates the gap. Because of the reaction between the magnetic field and the contact fluid, loss of the fluid while at a standstill is generally prevented. Further, when the rotor is turning, the current flowing through the ferromagnetic fluid causes an additional contraction of the contact fluid, which tends to counteract the lateral flow-off due to the centrifugal forces which are generated.

The ferromagnetic contact fluid, alternately, may comprise a non-magnetic metallic liquid which contains ferromagnetic particles in, at least, approximately homogeneous distribution. The specific gravity of these ferromagnetic particles, preferably, are equal to that of the non-magnetic liquid metal. This helps to minimize the separation of the ferromagnetic particles from the non-magnetic liquid, due to centrifugal forces, at higher rotational speeds.

In a further embodiment of the contact arrangement, an electromagnet, whose coils are embedded in the stator of the machine and which are arranged approximately in a ring about the outer periphery of the rotor, is provided for generating the magnetic field. The reactive force between the magnetic field and the ferromagnetic fluid may be controlled by varying the intensity of the magnetic field such that the constraining force generated can be matched to the rotational speed of the rotor. Thus, the increased tendency of the fluid to flow off laterally with increasing rotational speed can be offset by a corresponding increase of the current through the electromagnetic coils.

BRIEF DESCRIPTION OF THE DRAWINGS

Reference is now made to the accompanying drawings for a better understanding of the nature and objects of the invention. The drawings illustrate the best mode presently contemplated for carrying out the objects of the invention and its principles, and are not to be construed as restrictions or limitations on its scope. In the drawings.

DESCRIPTION OF THE PREFERRED EMBODIMENT

Figure 1:
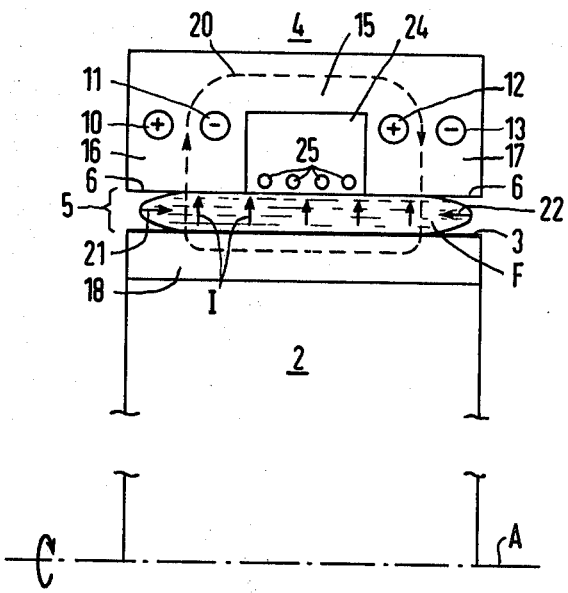
FIG. 1 is a schematic, cross-sectional view of a part of a DC machine with a contact arrangement according to the invention.

Referring to FIG. 1, there is shown a rotor, 2, of an electric machine, which is preferably a DC type machine. The rotor has an axis A about which it rotates. Concentrically surrounding the outer perimeter, 3, of the rotor is a magnet arrangement 4. The magnet arrangement, cylindrical in shape, forms an air gap 5 between its inside surface 6 and the outer perimeter 3 of the rotor. The magnet arrangement 4 includes at least four axially disposed coils, 10, 11, 12 and 13. The magnet arrangement 4 further incudes a U-shaped profiled body of ferromagnetic material, e.g., iron, identified by No. 15, which magnetically couples the coils 10 through 13. The profiled body 15 includes lateral parts 16 and 17 into which are placed coils 10 and 11 and 12 and 13, respectively. The flow of current in coils 10 and 11 as well as coils 12 and 13 alternate as indicated by the plus sign and minus sign indications.

The current through the coils 10 through 13 sets up a magnetic field 20 which passes through the outer part, 18, of the rotor, the air gap 5 and the ferromagnetic profiled body, 15. The outer portion, 18, of the rotor would likewise consist of a ferromagnetic material such as iron.

Interposed in the air gap 5 is an electrically conductive, ferromagnetic contact fluid F. This fluid serves as an electrical contact between the outer surface 3 of the rotor and the magnetic arrangement 4, surrounding the rotor. A current, I, would normally flow in a radially outward direction from the rotor to the magnetic arrangement. This is indicated by the direction of the arrows in FIG. 1.

When the rotor 2 is at rest, the contact fluid F is held in a stable position within the air gap 5 by the magnetic field generated by the current in coils 10 through 13. When the rotor revolves abut axis A, in addition to the confining force generated when the rotor is at rest, there is also developed an additional constraining force. This additional constraining force is due to the radially directed magnetic field, acting on the fluid F which is taken along due to friction forces, by the outer perimeter 3 of the rotor 2. With the direction of the magnetic field constant these forces acting on the co-rotating charge particles of the contact fluid F are directed axially inward or outward depending on the direction of rotation of the rotor 2. The polarity and direction of the magnetic field generated by the coils 10 through 13 can be arranged such that the additional constraining forces acting on the co-rotating fluid F are exerted in the direction of arrows 21 and 22, i.e. pointing toward the center of the air gap 5, parallel to the axis A. The polarity of the magnetic field generated by coils 10 through 13 can be reversed to offset a corresponding reversal in the direction of rotation of the rotor.

Thus, if the relation between the polarity of the magnetic field and the direction of rotation of the rotor 2 is chosen correctly, these lateral constraining forces, identified by 21 and 22, can prevent the fluid F from flowing out of the gap area. Of course, the greater the flux of the magnetic field, 20, the greater the forces 21 and 22 become. At higher speeds of the rotor 2, there is increased pressure on the contact fluid F which is carried along by the outer perimeter of the rotor 2. The increased tendency to expand towards the side of the gap and flow out therefrom can thus be prevented by increasing the current through the coils 10 through 13. This current can be controlled so that the restraining forces developed by the coils on the co-rotating ferromagnetic fluid F are always larger than the centrifugal forces which would tend to force the fluid out of the gap. Of course, in the situation where the higher rotational speeds increase the pressure on the fluid confined to the gap, the liquid volume and the hydrostatic pressure of the fluid F can be adjusted from the outside via inlet and outlet lines (not shown) which can regulate the volume of the fluid.

FIG. 1 also shows embedded in the profiled body 15, a ring-shaped core 24 of non-magnetic material such as copper or non-magnetic steel. The inner surface of the ring 24, contiguous with the air gap 5 forms a continuous surface with the inside surface 6 of the profiled body 15. The core 24 includes a plurality of annular cavities 25 which funnel a coolant therethrough to remove the heat generated by the frictional forces between the fluid F and the surfaces 3 and 6. However, it is not necessary that these cooling canals be limited to the annular core 24. It is to be appreciated that similar cooling schemes can be employed in the lateral portions 16 and 17, in the vicinity of the gap, of the profiled body 15 or even in the outer part, 18, of the rotor 2.

It is not necessary that the contact fluid employed be in and of itself a ferromagnetic type fluid. A non-magnetic liquid metal, through which ferromagnetic particles are admixed at least approximately, homogeneously may also be used. Preferably, the ferromagnetic particles and the non-magnetic liquid metal should have approximately the same specific gravity. This helps to insure that the ferromagnetic particles remain approximately uniformly distributed in the contact fluid both when the rotor is at a standstill as well as when it rotates. Such a combination might include, sodium-potassium or gallium-indium as the non-magnetic liquid metal with iron or certain iron alloys used as the ferromagnetic particles.

Figure 2:
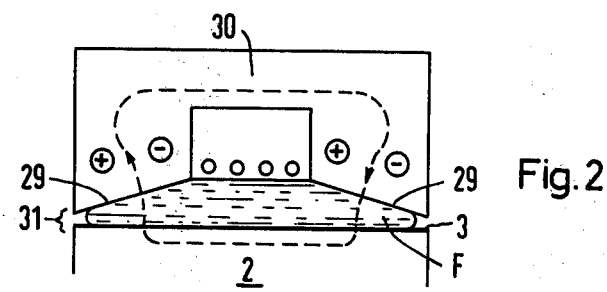
FIGS. 2 and 3 are schematic, cross-sectional views of two alternate embodiments of the invention, depicting various pole piece configurations suitable for use in the invention.

Referring to FIG. 2, a variation in the basic embodiment of FIG. 1 is depicted. There the surface 29 of the profiled body 30 facing the outer perimeter 3 of the rotor 2 is structured such that the width of the air gap 31 between the opposing surfaces is greater at the center of the profiled body 30, decreasing as one moves from the center to either lateral edge. The magnetic field strength in the tapered gap 31 thus increases towards the lateral edges with the result that the constraining forces confining the contact fluid F increase at these lateral edges. The mechanical friction losses, which increase with the narrowing of the gap 31, as is known in the art, remain essentially confined to these relatively small, outer zones.

Figure 3:
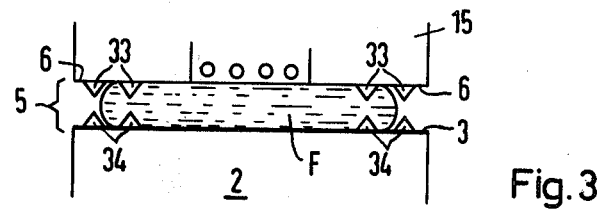

Referring to FIG. 3, there is shown another illustration which combines both mechanical and inductive principles to further restrain the lateral movement of the fluid F out of the gap 5. In this embodiment, protrusions 33 and 34 are provided on the inside surface 6 and outer perimeter 3 respectively. These protrusions, 33 and 34, are typically of triangular cross-section. They protrude or project into the air gap 5 such that the apex of the triangles are co-axially aligned one with the other. The protrusions 33 and 34 are advantageously disposed near the lateral edges and thus bring about a constriction of the air gap 5 at this point. The restriction of the gap due to the protrusions results in a higher constraining force due to the increased magnetic field, as noted with regard to the embodiment of FIG. 2, and further restricts in a mechanical sense the lateral flowing of the fluid F.

Other embodiments of the magnetic arrangement 4, in light of the above, will now be apparent to those skilled in the art. The principles involved in design of similar embodiments to those described above require that when the rotor 2 is at rest, the contact fluid F is prevented from flowing through the lateral edges of the gap when under the influence of gravity. Further, the design must be such that when the rotor finally achieves the desired operating speed, the radial pressure of the liquid which tends to disperse the fluid outside of the lateral edges of the gap is offset by the magnetic forces which are developed by the current flowing through the ferromagnetic fluid. The increased restraining force required at rotational speeds can also be provided by increasing the current supplied to the magnet arrangement 4. Further, the current to the magnet arrangement 4 can be made proportional to the speed of the rotor 2 such that the resulting forces are also proportional. The self-stabilizing effect of the forces generated by the current passing through the contact fluid F can be further increased by adding ferromagnetic particles to the contact fluid.

It is also apparent that the machine described above could be operated under a partial vacuum or in a protective gas such that the oxidation affects or moisture affects on the contact fluid would be substantially reduced.

What is claimed is:

1. In a fluid contact arrangement for use in an electric machine which includes contact fluid interposed in the air gap formed between thr rotor and stator of said machine, the improvement comprising said contact fluid containing ferromagnetic particles, and means for generating a magnetic field in said gap at least approximately radially to the axis of rotation of said rotor, said magnetic field exerting a force on said contact fluid for retaining said fluid in said gap.

2. The fluid contact arrangement of claim 1, wherein said ferromagnetic contact fluid contains a plurality of ferromagnetic particles mixed in a nonmagnetic liquid metal in at least approximately homogeneous distribution.

3. The fluid contact arrangement of claim 2, characterized by the feature that the specific gravity of the ferromagnetic particles is at least approximately equal to that of the nonmagnetic liquid metal.

4. The fluid contact arrangement of claim 1, wherein said means for generating a magnetic field include an electromagnet, whose coils are embedded in the stationary part of said machine and are arranged approximately in ring-shape about the outer periphery of said rotor.

5. The fluid contact arrangement of claim 4, characterized by the feature that several coils are provided, said coils arranged parallel to each other and one behind the other in the direction of said axis of rotation.

6. The fluid contact arrangement of claim 5, characterized by the feature that the direction of the current in said coils can be reversed.

7. the fluid contact arrangement of claim 1 wherein at least one of said rotor or stator includes at least one protrusion extending substantially, radially into said air gap at the axial edges thereof.

8. The fluid contact arrangement of claim 1 wherein said rotor and stator are configured such that the width of said air gap is smaller at its axial edges than in the central portion thereof.

9. The fluid contact arrangement of claim 8 wherein at least one of said rotor or stator includes at least one protrusion extending substantially, radially into said air gap at said axial edges.

10. The fluid contact arrangement of claim 1, characterized by the feature that said magnetic field can be varied.

11. The fluid contact arrangement of claim 1, characterized by the feature that said magnetic field can be controlled to create a force which points toward the center of said air gap and which acts to restrain said fluid at the axial edges of said air gap.

* * * * *